W. H. VOSS.
WASHING MACHINE.
APPLICATION FILED OCT. 19, 1914.

1,222,050.

Patented Apr. 10, 1917.
2 SHEETS—SHEET 1.

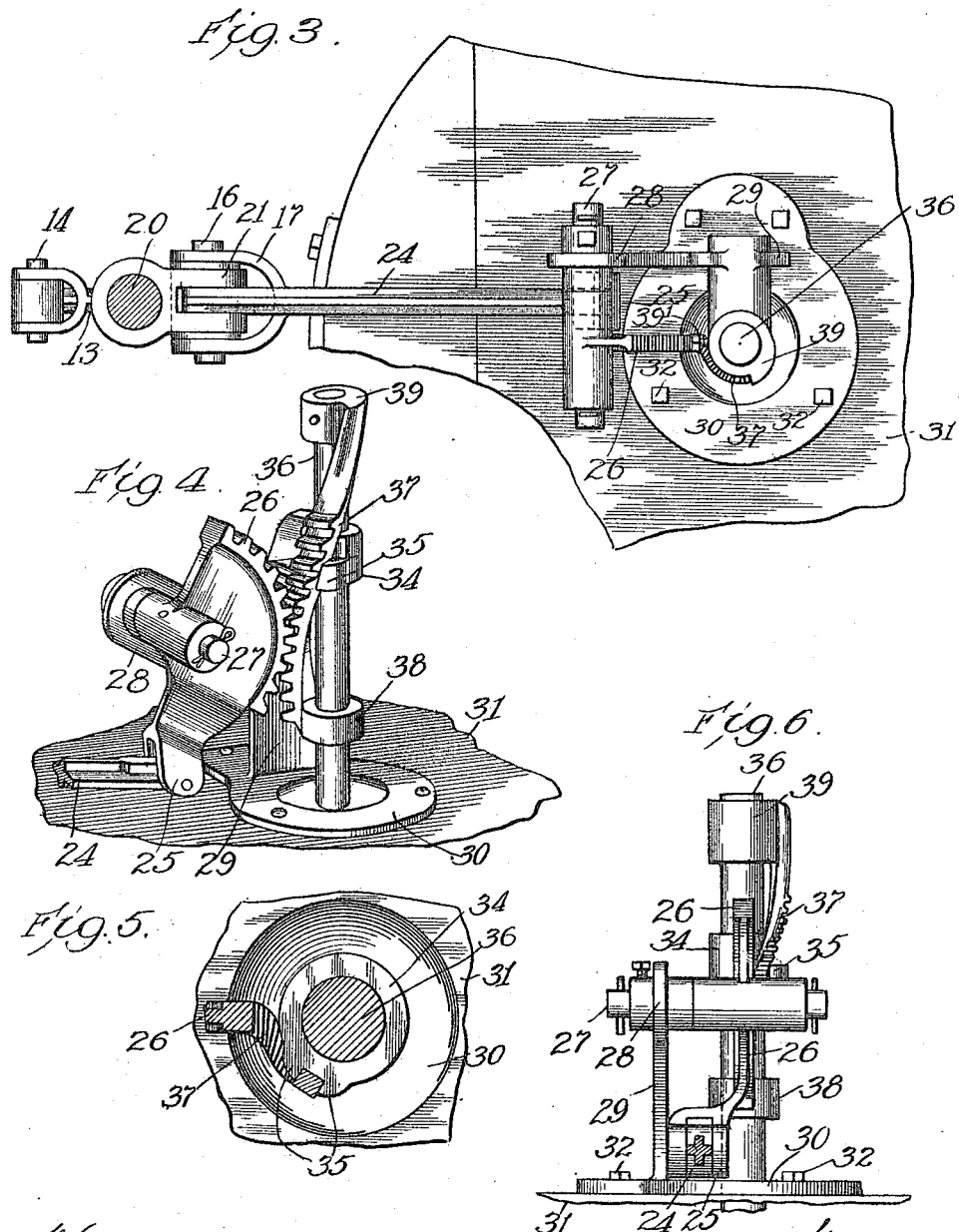

UNITED STATES PATENT OFFICE.

WILLIAM H. VOSS, OF DAVENPORT, IOWA.

WASHING-MACHINE.

1,222,050. Specification of Letters Patent. Patented Apr. 10, 1917.

Application filed October 19, 1914. Serial No. 867,334.

*To all whom it may concern:*

Be it known that I, WILLIAM H. Voss, a citizen of the United States, residing at Davenport, in the county of Scott, State of Iowa, have invented a new and useful Improvement in Washing-Machines, of which the following is a specification.

This invention relates to gearing and in particular to gearing adapted to be employed upon and in connection with washing machines.

It is an object of this invention to trasform a continuous rotary movement into a combined oscillatory and reciprocatory movement.

It is another object of my invention to provide gearing whereby a reciprocatory movement of one element of the gearing results in a combined oscillatory and reciprocatory movement of another element thereof.

It is a further object of my invention to provide a stirrer head for washing machines adapted to agitate and at the same time cause a current to be passed through the clothes. Other objects and advantages of the invention will appear as the description to follow proceeds.

Figure 1:
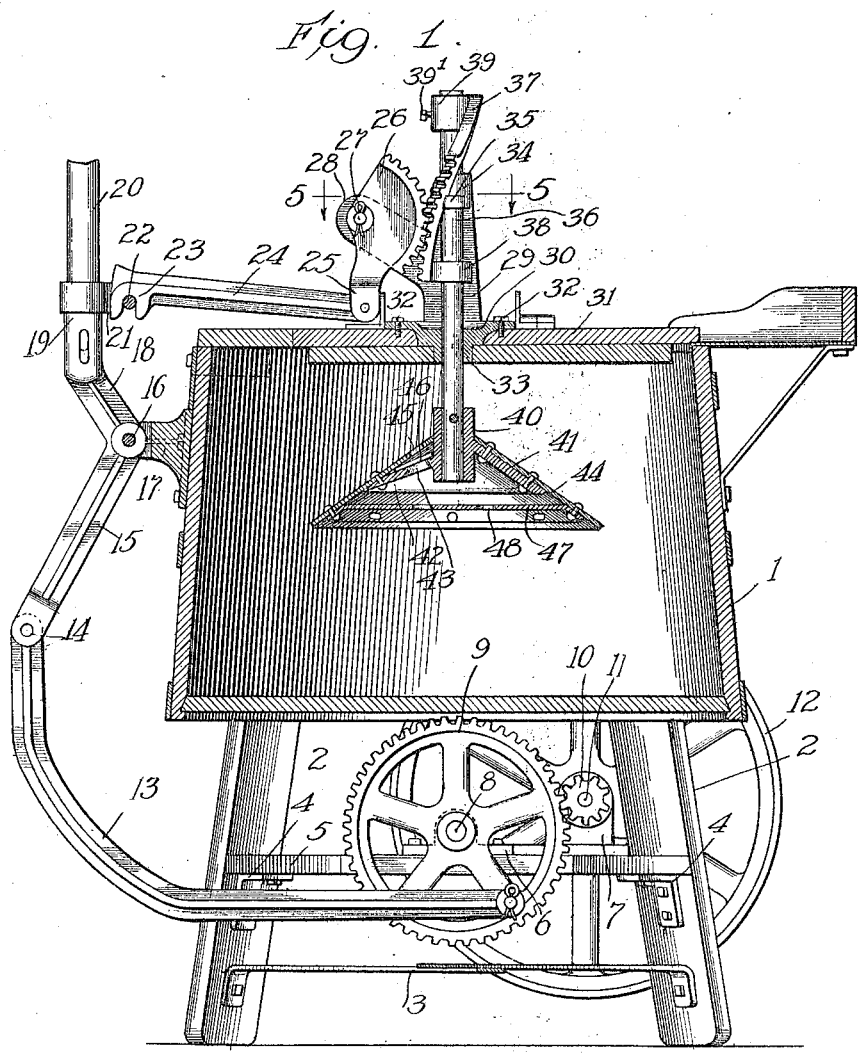
Figure 2:
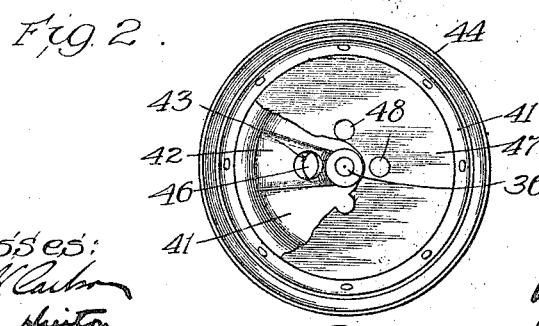

In the drawing Figure 1 is a cross section of a washing machine constructed according to my invention. Fig. 2 is a plan view partly broken away of the dasher or stirrer head of my invention. Fig. 3 is a top plan view of a portion of a washing machine constructed according to my invention. Fig. 4 is a detailed perspective view of the gearing. Fig. 5 is a cross section view on line 5—5 of Fig. 1. Fig. 6 is an elevation of a portion of the mechanism disclosed in Fig. 1.

Reference character 1 represents a wash tub of ordinary construction mounted upon the legs 2 which are braced near their lower extremities by the cross braces 3. Moutned on angle irons 4 secured to the legs 2 of the tub is a platform 5 on which are mounted the brackets 6 and 7. The bracket 6 carries the bearings for the shaft 8 upon which is rotatably mounted the gear wheel 9 in mesh with the pinion 10 of shaft 11 mounted in bracket 7 and carrying at its outer end a fly wheel or belt wheel 12. The gear wheel 9 is rotated by the curved pitman 13 pin connected at 14 with the arm 15 of a bent lever pivotally mounted at its angle upon the pin 16 in bracket 17 firmly secured to the side of the tub 1. The other arm 18 of the bent lever is provided with an angled socket 19 in which is firmly seated the handle 20. The socket 19 is provided at its upper end with a fork 21 spanned by the pin 22 upon which rests the hook 23 forming the end of the pitman 24 which is connected at its other end with the arm 25 extending from sector gear 26 mounted upon the shaft 27 carried by the arm 28 of the bracket 29 upstanding from the plate 30 secured in the lid 31 of the tub by screws such as 32. The plate 30 is provided with a central boss 33 bored to form a bearing for the dasher shaft to be described. Mounted upon the bracket 29 is a collar 34 which is bored in alinement with the bore of the plate 30 to form the second bearing for the dasher shaft. The collar 34 is provided with lugs 35 for a purpose to be described. The dasher shaft 36 rotatably and reciprocatively mounted in the two bearings just described is provided with a spiral gear 37 one end of which is integral with the collar 38 and the other end of which is integral with the collar 39 each of which is secured to the shaft 36 by a set screw such as 40. Thus the two collars 38 and 39 straddle the collar 34 on bracket 29. The back of the spiral gear is fitted somewhat snugly between the lugs 35 on collar 34.

It is obvious that in operation, as sector gear 26 is operated from handle 20 it will, at all times, engage with the spiral gear 37 which spiral gear and the shaft 36 to which it is attached oscillate on account of the engagement between the back of the spiral gear and the lugs 35, as the shaft 36 is reciprocated up and down.

At the lower end of shaft 36 is rigidly connected the hub 40 of the dasher head. Preferably integral with the hub 40 of the dasher head is the conical flange 41 having a depressed portion 42 provided with an aperture 43. A conical cap piece 44 is secured upon the conical flange 41 by means of rivets or other suitable connecting means and provided with an aperture 45. A valve 46 is seated in the recess between the depressed portion 42 and the conical cap piece 44 in such a fashion as to allow a current to pass upwardly through the apertures 43—45 but to prevent the passage of the current in the opposite direction. A web 47 closes the lower end of the conical cap piece 44 and is provided with holes 48.

In operation it is obvious that the oscillating movement of handle 20 will cause the dasher head to rise and fall while at the same time oscillating, and also will cause the fly wheel or belt wheel 12 to be rotated at a high rate of speed thus storing up momentum. The combined oscillating and reciprocating movement of the dasher head will then violently agitate the clothes in the tub causing them to spin backward and forward and thus cause the water to pass rapidly through them first in one direction and then in the other, and will also have a vacuum action upon said clothes. Thus when the dasher head is lowered it will force the clothes downward and compress them and squeeze air, bubbles and water out of them. To effect this result it should be noted that the web 47 is flat and located near the bottom of the conical cap piece 40, and moreover that bubbles, air and water in the clothes can escape upwardly from the dasher head by passing through holes 48, 43 and 45, the current lifting the valve 46. When, therefore, the dasher head is moved downwardly the clothes in the tub tend to be gathered into a more or less compact mass and the water, air and bubbles in them to be squeezed therefrom. When the dasher head is raised the valve 46 closes dropping over the aperture 43, causing a partial vacuum in the clothes which tends to draw water, air and bubbles, etc., back into the mass of clothes. Thus a washing machine constructed according to my invention will have upon the clothes the combined effect of a rapid oscillation and of a vacuum action.

The cover is hinged in a line parallel to link 24 so that when the cover is raised the hook 23 becomes disengaged from the pin 22, link 24, of course, being maintained at about the plane of the cover by reason of the fact that its pivot is close thereto. When the cover is again lowered hook 23 will drop into engagement with pin 22.

Having now described my invention in its preferred form and realizing that many departures and modifications therein may be made without departing from the scope of the claims,

I claim:—

1. In apparatus of the class described, a support, a member hinged thereto, a shaft in said member, a spiral gear mounted upon said shaft, a gear segment mounted upon said member for coöperating with said spiral gear and actuating means for oscillating said gear segment mounted upon the support.

2. In apparatus of the class described, a support, a member hinged to said support, a bracket on said hinged member, a shaft slidable and revoluble in said bracket, a guide on said bracket, a flange on said shaft continuously engaging said guide, a manually operable means for reciprocating said shaft, the engagement between the guide and flange causing a rotation of the shaft.

3. In apparatus of the class described, a support, a member hinged to said support, a bracket on said hinged member, a shaft slidable and revoluble in said bracket, a guide on said bracket, a flange obliquely mounted and on said shaft continuously engaging said guide, a fly wheel and gearing associated therewith, connections from said gearing for reciprocating said shaft.

4. In apparatus of the class described, a support, a hinged member on said support, an oscillating and reciprocating shaft in said hinged member, a spiral rack on said shaft, a guide on said hinged member engaging said rack, an oscillating gear segment in engagement with said rack, and an actuator for said gear segment on said support.

5. In apparatus of the class described, a support, a hinged member mounted on the support, a reciprocatory shaft in said hinged member, a curved member on said shaft, an actuator acting directly on said curved member to reciprocate the shaft, and connection between said curved member and the hinged member to cause simultaneous oscillation of said shaft.

6. In apparatus of the class described, a support, a hinged member mounted on the support, a reciprocatory shaft in said hinged member, a spiral flange on said shaft, a vertically oscillatory segment directly engaging said flange, and means to maintain the engagement between said flange and said segment.

7. In apparatus of the class described, a support, a hinged member mounted on the support, an oscillatory and reciprocatory shaft in said hinged member, a spiral rack fast upon said shaft, a gear segment for operating said rack, a means to maintain engagement at all times between the gear segment and the rack.

In witness whereof, I hereunto subscribe my name to this specification in the presence of two witnesses.

WILLIAM H. VOSS.

Witnesses:
 WILLIAM E. PULS,
 HOWARD LOGAN.

Copies of this patent may be obtained for five cents each, by addressing the "Commissioner of Patents, Washington, D. C."